United States Patent [19]
Aoshima et al.

[11] Patent Number: 6,157,107
[45] Date of Patent: Dec. 5, 2000

[54] MOTOR WITH MAGNETIC STATOR POLES INSIDE AND OUTSIDE THE ROTOR MAGNET

[75] Inventors: Chikara Aoshima, Zama; Toyoshige Sasaki, Yokohama, both of Japan

[73] Assignee: Canon Kabushiki Kaisha, Tokyo, Japan

[21] Appl. No.: 09/286,446

[22] Filed: Apr. 6, 1999

[30] Foreign Application Priority Data

Apr. 10, 1998 [JP] Japan ................................. 10-116078

[51] Int. Cl.[7] .......................... H02K 7/00; H02K 21/00; H02K 1/00; H02K 3/00; H02K 1/22

[52] U.S. Cl. .................. 310/156; 310/67 R; 310/266; 310/152; 310/179; 310/185; 310/267

[58] Field of Search ................................. 310/68 B, 49 R, 310/67 R, 156, 257, 266, 68 C, 68 R, 114, 51, 164, 40 MM, 49 A, 80, 152, 179, 180, 185, 187, 254, 181, 263, 298, 267

[56] References Cited

U.S. PATENT DOCUMENTS

| | | | |
|---|---|---|---|
| 3,205,383 | 9/1965 | Hurst | 310/162 |
| 3,253,169 | 5/1966 | Haydon | 310/156 |
| 4,296,341 | 10/1981 | Guttinger | 310/41 |
| 5,384,506 | 1/1995 | Aoshima | 310/49 R |
| 5,831,356 | 11/1998 | Aoshima | 310/49 R |
| 5,925,945 | 7/1999 | Aoshima | 310/49 R |
| 5,945,753 | 10/1999 | Maegawa et al. | 310/68 |
| 5,969,453 | 10/1999 | Aoshima | 310/156 |
| 5,973,425 | 10/1999 | Aoshima | 310/49 |
| 6,046,517 | 4/2000 | Sasaki et al. | 310/40 MM |

*Primary Examiner*—Nick Ponomarenko
*Assistant Examiner*—Guillermo Perez
*Attorney, Agent, or Firm*—Fitzpatrick, Cella, Harper & Scinto

[57] ABSTRACT

A motor includes a rotor including a permanent magnet circumferentially equally divided and alternately magnetized to different poles into a cylindrical shape. A first coil and a second coil are displayed inside and axially of the rotor. First outer magnetic poles and first inner magnetic poles are excited by the first coil and are opposed to the outer peripheral surface and inner peripheral surface of the rotor, respectively. Second outer magnetic poles and second inner magnetic poles excited by the second coil are opposed to the outer peripheral surface and inner peripheral surface of the rotor, respectively. The first inner magnetic poles and the second inner magnetic poles are located between the first coil and the second coil, to thereby make the opposed area of the outer magnetic poles, the inner magnetic poles and the magnet large and provide a super-compact motor of a high output and high efficiency.

18 Claims, 10 Drawing Sheets

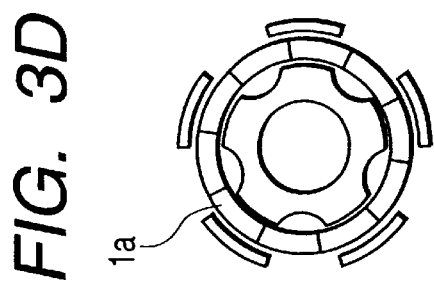
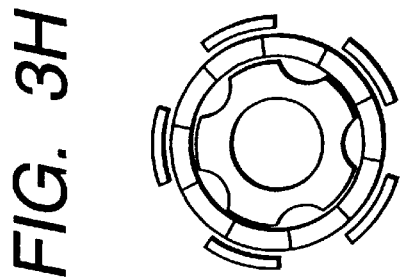
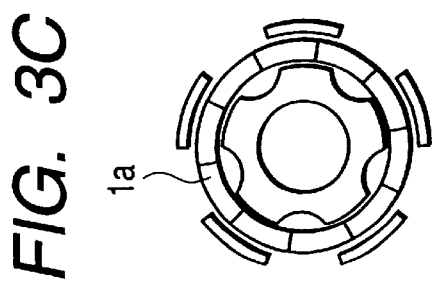
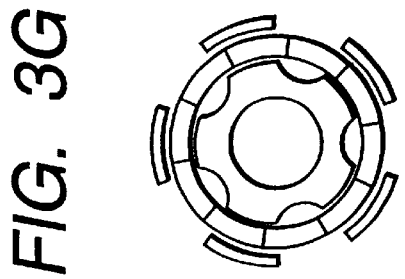
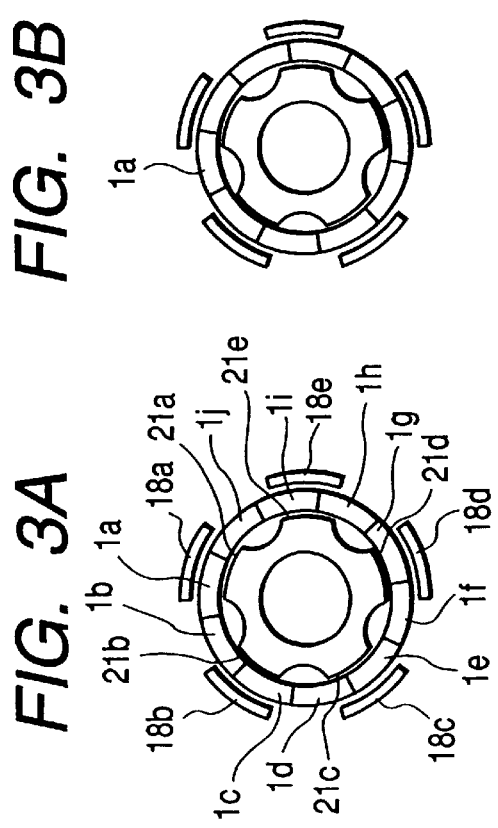
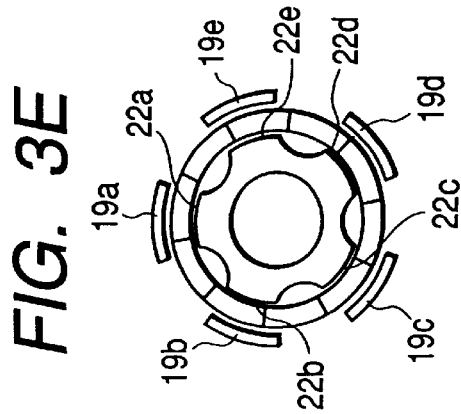

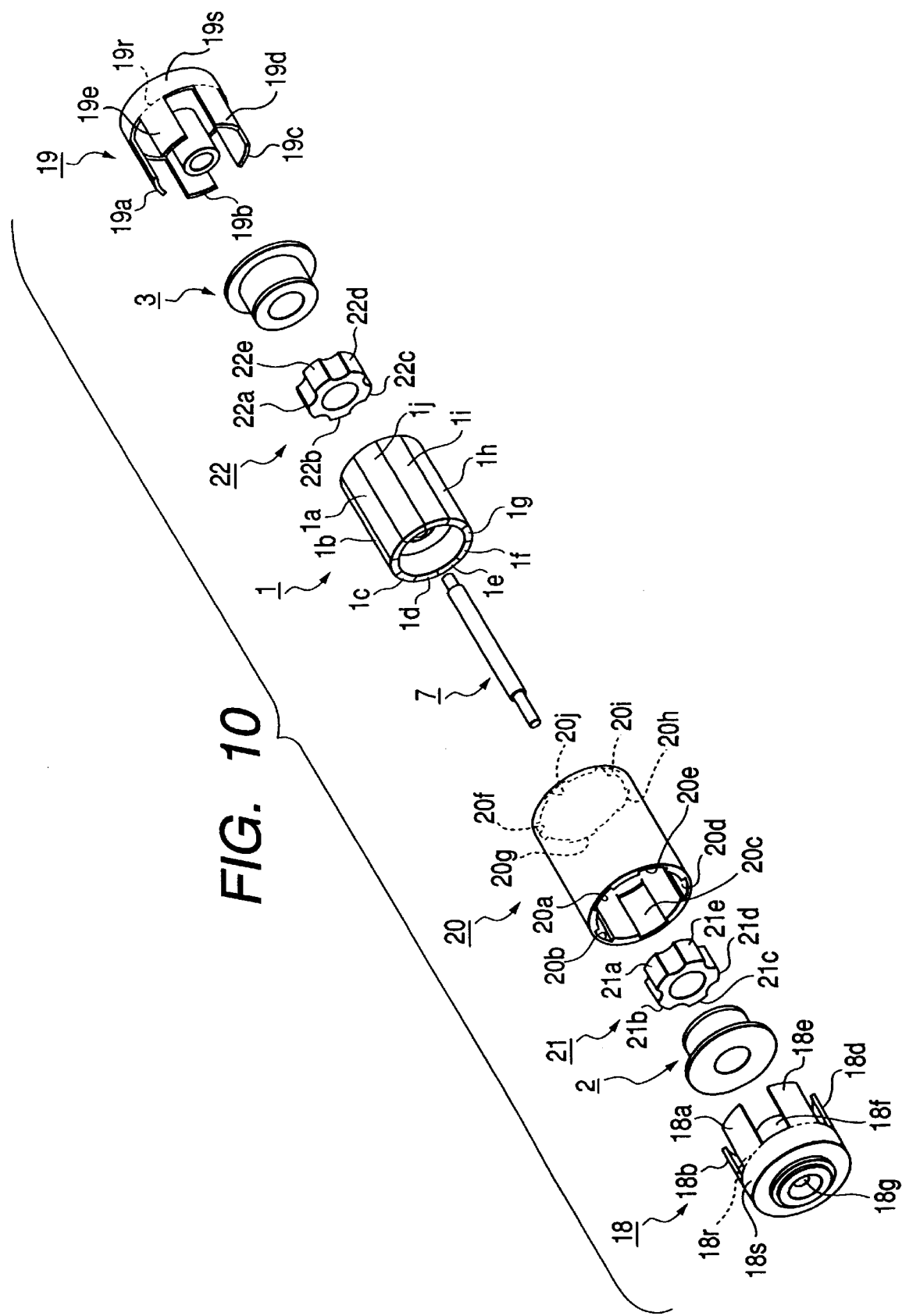

MOTOR WITH MAGNETIC STATOR POLES INSIDE AND OUTSIDE THE ROTOR MAGNET

BACKGROUND OF THE INVENTION

1. Field of the Invention

This invention relates to a super-compact motor designed for a high output and high efficiency.

2. Related Background Art

As what is formed as a compact motor, there is, for example, a compact cylindrically-shaped step motor as shown in FIG. 12 of the accompanying drawings. A stator coil 105 is concentrically wound on a bobbin 101, which is axially sandwiched and fixed between two stator yokes 106, on which stator teeth 106a and stator teeth 106b are alternately disposed in the circumferential direction of the inner diametral surface of the bobbin 101, and the stator yokes 106, integral with the stator teeth 106a or 106b, are fixed to cases 103, whereby a stator 102 is constructed.

A flange 115 and a bearing 108 are fixed to one of the two sets of cases 3, and another bearing 108 is fixed to the other case 103. A rotor 109 comprises a rotor magnet 111 fixed to a rotor shaft 110, and the rotor magnet 111 cooperates with the stator yokes 106 of the stator 102 to form radial clearance portions. The rotor shaft 110 is rotatably supported between the two bearings 108.

The above-described compact step motor according to the prior art, however, suffers from the disadvantage that the output thereof does not become high because a magnetic flux created by the supply of electric power to the stator coil 105 does not effectively act on the rotor magnet 111 for it to pass chiefly the end surface 106a1 of the stator teeth 106a and the end surface 106b1 of the stator teeth 106b, as shown in FIG. 13 of the accompanying drawings.

The applicant of the basic application filed in Japan proposed in U.S. Pat. No. 5,831,356 a motor which solved such a problem.

This proposed motor is constructed such that a rotor comprising a permanent magnet, circumferentially equally divided and alternately magnetized to different poles, is formed into a cylindrical shape, and a first coil, a rotor and a second coil are disposed axially of the rotor in the named order, and a first outer magnetic pole and a first inner magnetic pole excited by the first coil are opposed to the outer peripheral surface and inner peripheral surface, respectively, of the rotor, and a second outer magnetic pole and a second inner magnetic pole excited by the second coil are opposed to the outer peripheral surface and inner peripheral surface, respectively, of the rotor, and a rotary shaft, which is a rotor shaft is taken out of the cylindrically-shaped permanent magnet.

The motor of such a construction is high in output and the outer dimension thereof can be made small, but the diametral dimensions of the inner magnetic poles are small and therefore, the working of the magnetic pole teeth thereof is difficult, and it has been desired that a fluctuation-free stable output be obtained from a motor of a small diametral dimension.

Therefore, the applicant of the basic application filed in Japan has recently proposed in U.S. patent application Ser. No. 08/994,994 a motor in which the shape of inner magnetic poles is a shape of good workability, and a rotor, in which output transmitting means such as gears and pulleys can be easily mounted on a rotary shaft of a small diametral dimension and from which a fluctuation-free stable output can be obtained, has been proposed in U.S. patent application Ser. No. 09/022,474.

Further, it has recently been desired to provide a motor which is constructed super-compactly and yet has a higher output and high efficiency.

SUMMARY OF THE INVENTION

The present invention has been made in view of the above-noted situation and an object thereof is to provide a super-compact motor designed for a high output and high efficiency.

Another object of the present invention is to increase the opposed area of the magnetic pole of a stator and a magnet to thereby increase the rate at which a magnetic flux created in a coil crosses the magnet.

Further objects of the present invention will become apparent from the following description made of some specific embodiments of the invention.

BRIEF DESCRIPTION OF THE DRAWINGS

FIGS. 3A, 3B, 3C, 3D, 3E, 3F, 3G and 3H are illustrations of the rotational operation of the rotor of the motor shown in FIG. 2.

FIG. 10 is an exploded perspective view of a motor according to Embodiment 3 of the present invention.

DESCRIPTION OF THE PREFERRED EMBODIMENTS

Some embodiments of the present invention will hereinafter be described with reference to the drawings. First, Embodiment 1 of the present invention will be described with reference to FIGS. 1 to 5.

Figure 1:
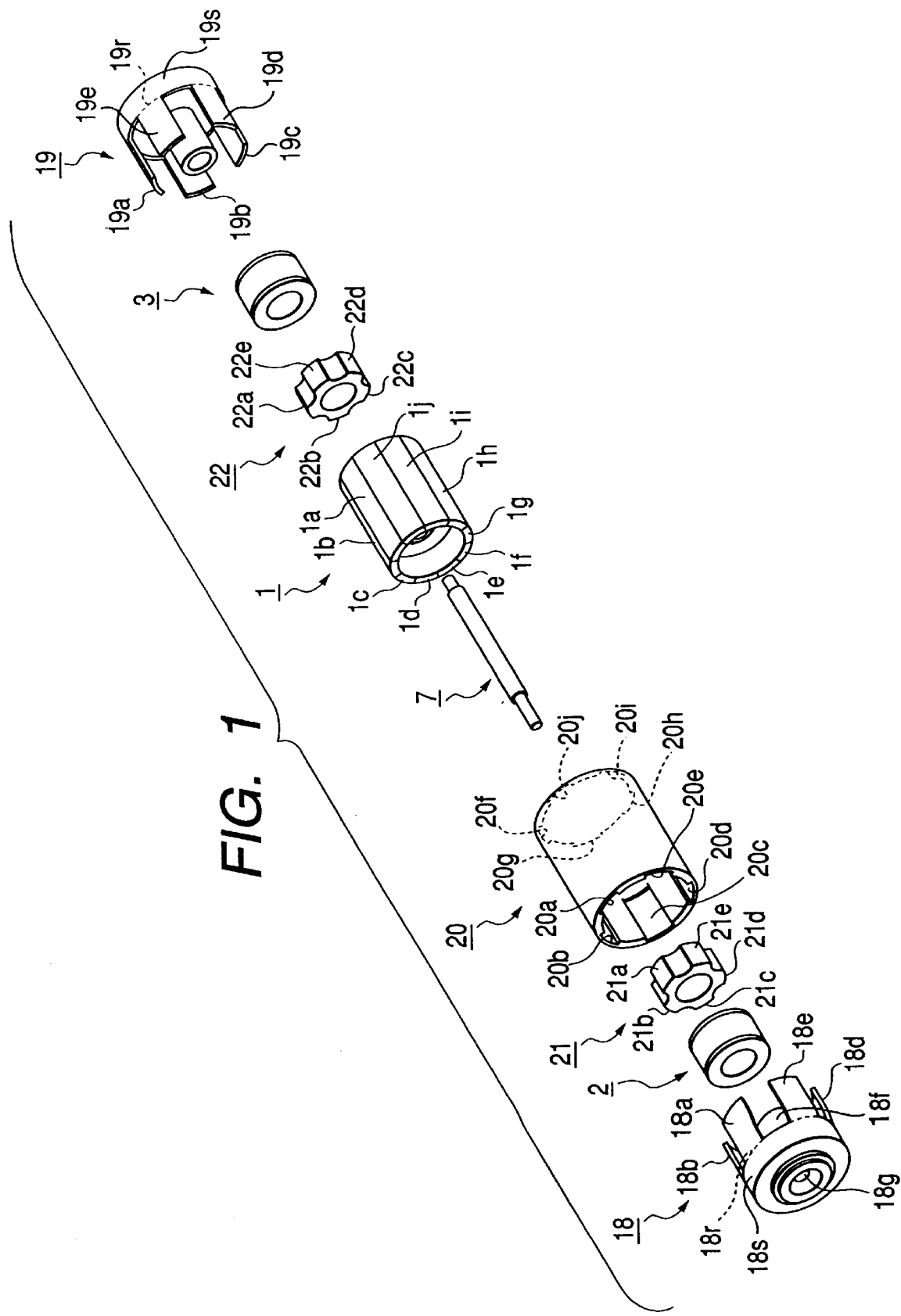
FIG. 1 is an exploded perspective view of a motor according to Embodiment 1 of the present invention.
Figure 2:
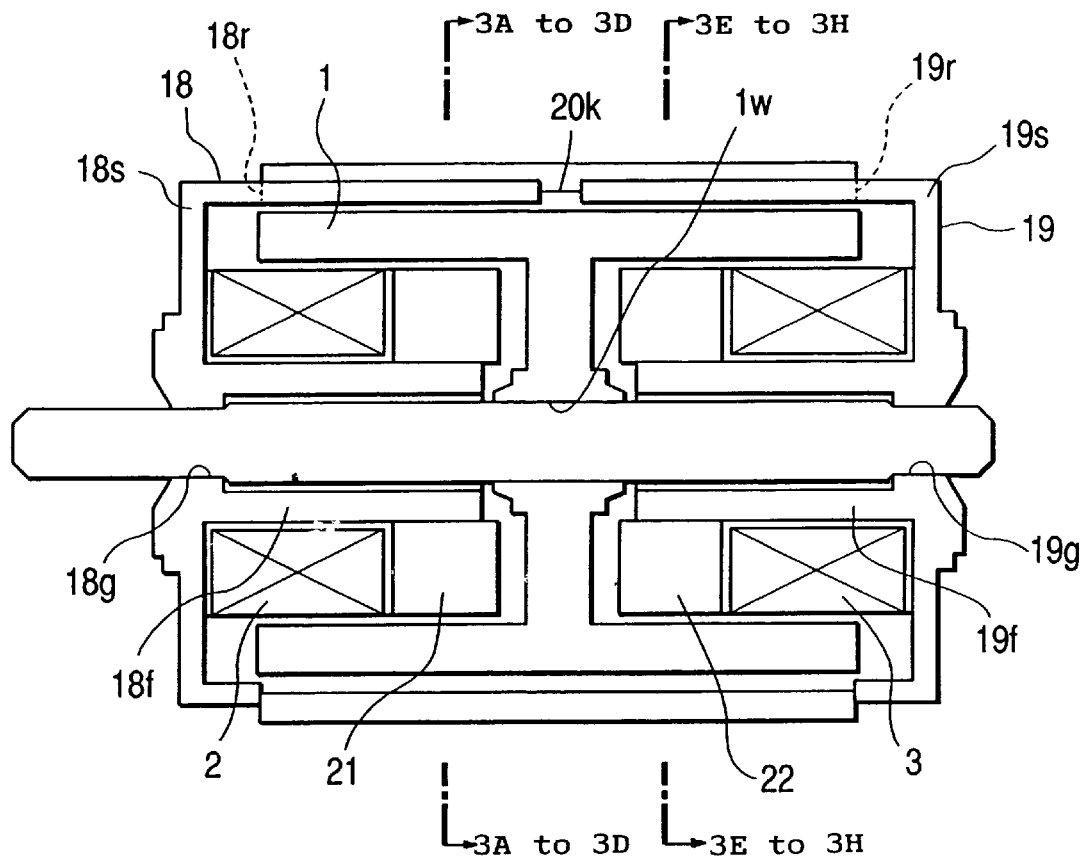
FIG. 2 is a cross-sectional view of the motor shown in FIG. 1 during the assembly thereof.
Figure 4:
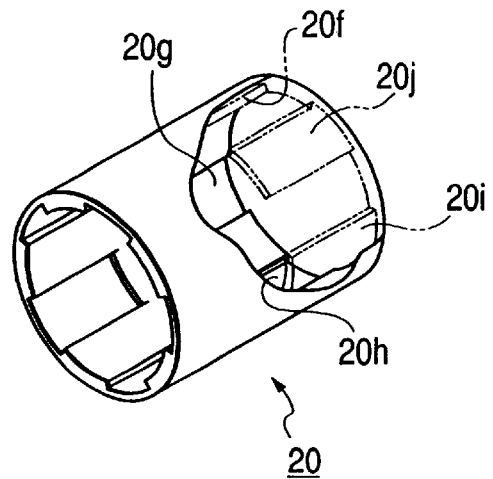
FIG. 4 is a partly cut-away perspective view of a connecting ring shown in FIG. 2.

FIGS. 1 to 4 show a step motor according to Embodiment 1 of the present invention. FIG. 1 is an exploded perspective view of the step motor, FIG. 2 is an axial cross-sectional view of the step motor after being assembled, and FIGS. 3A to 3H are cross-sectional views taken along the line 3A to 3D–3A to 3D and the line 3E to 3H–3E to 3H of FIG. 2. FIG. 4 is a partly cutaway perspective view of a connecting ring.

In FIGS. 1 to 4, the reference numeral 1 designates a cylindrically-shaped magnet constituting a rotor, and this magnet 1, which is a rotor, has its outer peripheral surface circumferentially divided into n (in the present embodiment, 10) sections to form magnetized portions 1*a*, 1*b*, 1*c*, 1*d*, 1*e*, 1*f*, 1*g*, 1*h*, 1*i* and 1*j* alternately magnetized to S poles and N poles, and the magnetized portions 1*a*, 1*c*, 1*e*, 1*g* and 1*i* are magnetized to S poles and the magnetized portions 1*b*, 1*d*, 1*f*, 1*h* and 1*j* are magnetized to N poles. The magnet is formed of a plastic magnet material formed by injection molding. Thereby, the thickness of the magnet can be made very small with respect to the radial direction of the cylindrical shape. Also, the magnet 1 is provided with a fitting portion 1*w* of a small inner diameter in the axially central portion thereof.

The reference numeral 7 denotes an output shaft, which is a rotor shaft, and this output shaft 7 is secured to the fitting portion 1*w* of the magnet 1, which is the rotor by being pressed in. Since the magnet 1 is formed of a plastic magnet material formed by injection molding, it is not broken even by assembly by a press-in operation and the manufacture thereof becomes easy in spite of a complicated shape provided with the fitting portion 1*w* of a small inner diameter in the axially central portion. Also, since the output shaft 7 and the magnet 1 are assembled and secured by a press-in operation the assembly thereof is easy and inexpensive manufacture becomes possible. Also, the output shaft 7 and the magnet 1 together constitute the rotor.

The reference numerals 2 and 3 designate cylindrically shaped coils having an outer diameter slightly smaller than the inner diameter of the magnet 1. The coils 2 and 3 are concentric with the magnet 1 and are disposed inside the magnet 1.

The reference numerals 18 and 19 denote a first stator and a second stator, respectively, formed of a soft magnetic material, and the first stator and the second stator are disposed 180/n degrees, i.e., 18°, out of phase with each other, and the first stator and the second stator each comprise an outer cylinder and an inner cylinder.

The outer cylinder of the first stator 18 has its fore end portion forming first outer magnetic poles 18*a*, 18*b*, 18*c*, 18*d* and 18*e*. The reference numeral 21 designates a first auxiliary stator having its inner diameter portion 21*f* fitted and secured to the inner cylinder 18*f* of the first stator 18 and having its outer diameter portion formed with radially outwardly protruding portions 21*a*, 21*b*, 21*c*, 21*d* and 21*e* which are first inner magnetic poles at phases opposed to the outer magnetic poles 18*a*, 18*b*, 18*c*, 18*d* and 18*e* of the first stator 18. The protruding portions 21*a*, 21*b*, 21*c*, 21*d* and 21*e*; which are the first inner magnetic poles, are formed with a deviation of 360/(n/2) degrees, i.e., 72°, so as to be in phase with respect to the magnetization of the magnet 1, and the first outer magnetic poles 18*a*, 18*b*, 18*c*, 18*d* and 18*e* of the first stator 18 are formed with a deviation of 360/(n/2) degrees, i.e., 72°, so as to be in phase with respect to the magnetization of the magnet 1. The first auxiliary stator 21 is located between the coil 2 and the coil 3, i.e., between the coil 2 and a wall portion forming the fitting portion 1*w* of the magnet 1.

The outer cylinder of the second stator 19 has its fore end portion forming second outer magnetic poles 19*a*, 19*b*, 19*c*, 19*d* and 19*e*. The reference numeral 22 denotes a second auxiliary stator having its inner diameter portion 22*f* fitted and secured to the inner cylinder 19*f* of the second stator 19 and having its outer diameter portion formed with radially outwardly protruding portions 22*a*, 22*b*, 22*c*, 22*d* and 22*e*, which are second inner magnetic poles at phases opposed to the outer magnetic poles 19*a*, 19*b*, 19*c*, 19*d* and 19*e* of the second stator. The protruding portions 22*a*, 22*b*, 22*c*, 22*d* and 22*e*, which are the second inner magnetic poles, are formed with a deviation of 360/(n/2) degrees, i.e., 72°, so as to be in phase with respect to the magnetization of the magnet 1, and the second outer magnetic poles 19*a*, 19*b*, 19*c*, 19*d* and 19*e* of the second stator 19 are formed with a deviation of 360/(n/2) degrees, i.e, 72°, so as to be in phase with respect to the magnetization of the magnet 1. The second auxiliary stator 22 is located between the coil 2 and the coil 3, i.e., between the coil 3 and the wall portion forming the fitting portion 1*w* of the magnet 1.

The outer magnetic poles 18*a*, 18*b*, 18*c*, 18*d* and 18*e* of the first stator 18 and the outer magnetic poles 19*a*, 19*b*, 19*c*, 19*d* and 19*e* of the second stator 19 are constituted by cut-away apertures and teeth extending in a direction parallel to the shaft. By this construction, the formation of the magnetic poles becomes possible while minimizing the diameter of the motor. That is, if the outer magnetic poles are formed by radially extending unevenness, the diameter of the motor will become correspondingly larger, but in the present embodiment, the outer magnetic poles are constituted by cut-away apertures and teeth extending in a direction parallel to the shaft and therefore, the diameter of the motor can be minimized.

The outer magnetic poles 18*a*, 18*b*, 18*c*, 18*d* and 18*e* of the first stator 18 and the outer diameter portions 21*a*, 21*b*, 21*c*, 21*d* and 21*e* of the first auxiliary stator, which are the first inner magnetic poles, are provided so as to sandwich one end of the magnet 1 in opposed relationship with the outer peripheral surface and inner peripheral surface of one end of the magnet 1. Also, one end portion of the output shaft 7 is rotatably fitted in the aperture 18*g* of the first stator 18.

The outer magnetic poles 19*a*, 19*b*, 19*c*, 19*d* and 19*e* of the second stator 19 and the outer diameter portions 22*a*, 22*b*, 22*c*, 22*d* and 22*e* of the second auxiliary stator, which are the second inner magnetic poles, are provided so as to sandwich the other end of the magnet 1 in opposed relationship with the outer peripheral surface and inner peripheral surface of the other end of the magnet 1. Also, the other end portion of the output shaft 7 is rotatably fitted in the aperture 19*g* of the second stator 19.

The coil 2 is provided between the outer cylinder and inner cylinder of the first stator 18, and by this coil 2 being supplied with electric power, the first stator 18 and the first auxiliary stator 21 are excited.

The coil 3 is provided between the outer cylinder and inner cylinder of the second stator 19 and by this coil 3 being supplied with electric power, the second stator 19 and the second auxiliary stator 22 are excited.

Accordingly, a magnetic flux created by the coil 2 crosses the magnet 1, which is the rotor, between the outer magnetic poles 18*a*, 18*b*, 18*c*, 18*d*, 18*e* and the inner magnetic poles 21*a*, 21*b*, 21*c*, 21*d*, 21*e* and therefore effectively acts on the magnet which is the rotor, and a magnetic flux created by the coil 3 crosses between the outer magnetic poles 19*a*, 19*b*, 19*c*, 19*d*, 19*e* and the inner magnetic poles 22*a*, 22*b*, 22*c*, 22*d*, 22*e* and therefore effectively acts on the magnet which is the rotor, thereby enhancing the output of the motor.

Figure 5:
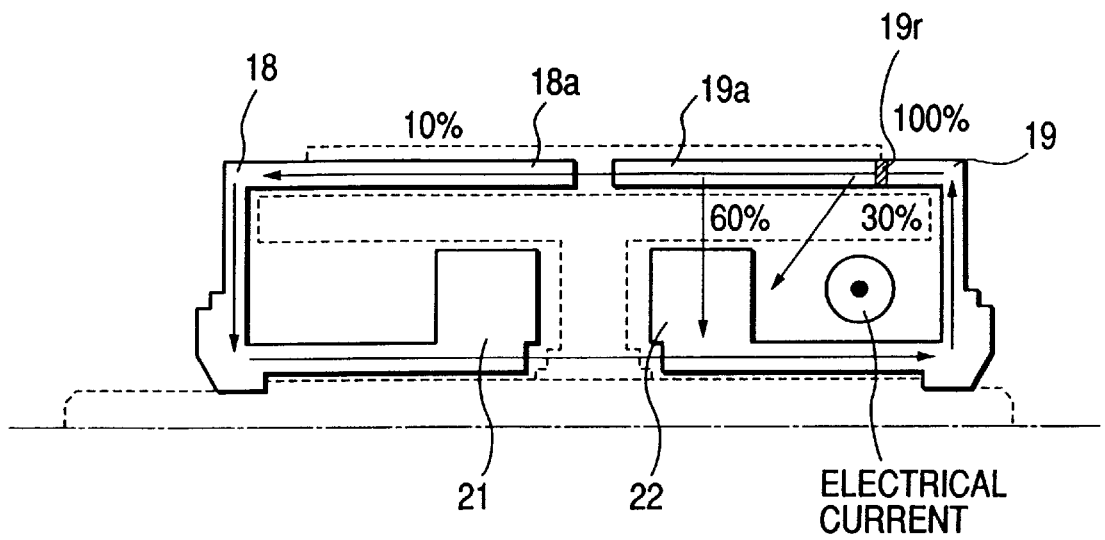
FIG. 5 is an illustration illustrating the flow of a magnetic flux created by a coil shown in FIG. 2.

Next, the result found as to what route the magnetic fluxes, created by the coils, flow along by the analysis of a three-dimensional finite element is shown in FIG. 5. FIG. 5 shows the calculation when an electric current has been supplied to only the coil 3, and displays the upper half in the same cross-sectional view as FIG. 2. Parts or portions in FIG. 5 which are similar to parts or portions in FIGS. 1 to 4 are designated by the same reference characters as those used in FIGS. 1 to 4.

About 10% of that part of the magnetic flux created by the coil 3, which has flowed into the second outer magnetic pole 19a, flows from the second outer magnetic pole portion 19a to the first outer magnetic pole portion 18a, and 60% thereof flows through the portion in which the second outer magnetic pole portion 19a and the second inner magnetic pole portion 22a are opposed to each other. Also, the remaining 30% flows from the second outer magnetic pole portion 19a to the second inner magnetic pole portion 22a through the portion in which they are not opposed to each other. The rate at which this magnetic flux is distributed is the same with respect also to the second outer magnetic pole portions 19b, 19c, 19d and 19e, from the symmetry of the stator about its shaft. Further, the relation of the magnetic flux created by the other coil 2 regarding the first outer magnetic pole portions 18a–18e and the first inner magnetic pole portions 21a–21e is distributed similarly to the magnetic flux created by the coil 3.

As described above, about 90% (60%+30%) of the magnetic flux flowing into the outer magnetic poles flows from the outer magnetic poles to the inner magnetic poles, and it goes out of the whole of the inner surfaces of the outer magnetic poles. Accordingly, the output of the motor is enhanced by opposing the outer peripheral surface of the magnet 1 to the whole of the inner surfaces of the outer magnetic poles.

So, by disposing the first coil 2 inside the magnet 1 with a clearance interposed therebetween, it is possible to secure a large area for the portion in which the first outer magnetic pole portions 18a, 18b, 18c, 18d and 18e and the outer peripheral surface of the magnet 1 are opposed to one another. Likewise, by disposing the second coil 3 inside the magnet 1, it is possible to secure a large area for the portion in which the second outer magnetic pole portions 19a, 19b, 19c, 19d and 19e and the outer peripheral surface of the magnet 1 are opposed to one another. Thereby, the rate of the magnetic fluxes going around the coils which cross the magnet is increased, and the output of the motor is enhanced.

While here, the first coil 2 and the second coil 3 are disposed inside the magnet 1, it is possible to secure a large area in which the outer magnet poles and the outer peripheral surface of the magnet are opposed to one another even if the coils are disposed so as to surround the outside of the magnet 1 and thus, the output of the motor is enhanced.

The first coil has a positional relation in which it is opposed to the magnet with a clearance interposed therebetween relative to the diametral direction, and the second coil has a positional relation in which it is opposed to the magnet with a clearance interposed therebetween relative to the diametral direction, whereby the magnetic flux going around the first coil can be made to directly cross the magnet and it becomes possible to secure a large area for the portion in which the first outer magnetic pole portions and the outer peripheral surface of the magnet are opposed to one another, and the magnetic flux going around the second coil can be made to directly cross the magnet and it becomes possible to secure a large area for the portion in which the second outer magnetic pole portions and the outer peripheral surface of the magnet are opposed to one another. Thereby, the rate of the magnetic fluxes created by the coils which cross the magnet is increased, and the output of the motor is enhanced.

The magnetic flux in an inner portion (the base side of the stator, i.e., the side near to the portion connecting the outer cylinder and inner cylinder of the stator together) interior of the root portion 18r or 19r of the outer magnetic pole portions (the boundary portion between the base 18s or 19s of the stator and the teeth forming the outer magnetic poles) (see FIGS. 1 and 2 also) does not contribute to the rotation of the rotor.

Therefore, it is enough if the magnet has a length axially from the root portion 18r of the first outer magnetic pole portion 18 to the root portion 19r of the second outer magnetic pole portion 19. Also, by the magnet having a length axially from the root portion 18r of the first outer magnetic pole portion to the root portion 19r of the second outer magnetic pole portion, substantially all of the magnetic flux flowing from the first outer magnetic pole portion to the first inner magnetic pole portion crosses the magnet, and substantially all of the magnetic flux flowing from the second outer magnetic pole portion to the second inner magnetic pole portion crosses the magnet. As the result, the rate of the magnetic fluxes created by the coils, which are converted into a rotative force, is increased and therefore, the efficiency of the motor is enhanced.

The reference numeral 20 designates a connecting ring as a cylindrically shaped member formed of a nonmagnetic material, and the details thereof are shown in the partly cut-away perspective view of FIG. 4. Grooves 20a, 20b, 20c, 20d and 20e are formed in the inner end side of this connecting ring 20, and grooves 20f, 20g, 20h, 20i and 20j which are 180/n degrees, i.e., 180, out of phase with respect to the grooves 20a, 20b, 20c, 20d and 20e, are formed in the other end side of the connecting ring 20, and the outer magnetic poles 18a, 18b, 18c, 18d and 18e of the first stator 18 are fitted in the grooves 20a, 20b, 20c, 20d and 20e, respectively, and the outer magnetic poles 19a, 19b, 19c, 19d and 19e of the second stator are fitted in the grooves 20f, 20g, 20h, 20i and 20j, respectively, and these members are fixed to each other by an adhesive agent. The first stator 18 and the second stator 19 are fixed with a certain distance interposed therebetween by the protruding portion 20k on the inner side of the connecting ring 20.

That is, the first stator 18 and the second stator 19 are disposed so that the fore ends of the outer magnetic poles 18a, 18b, 18c, 18d and 18e of the first stator 18 and the fore ends of the outer magnetic poles 19a, 19b, 19c, 19d and 19e of the second stator 19 may face each other. By the connecting ring being formed of a non-magnetic material, the first stator 18 and the second stator 19 can be cut in magnetic circuits and can be prevented from affecting each other, whereby the performance of the motor is stabilized.

FIG. 2 is a cross-sectional view of the step motor, FIGS. 3A, 3B, 3C and 3D are cross-sectional views taken along the line 3A to 3D–3A to 3D of FIG. 2, and FIGS. 3E, 3F, 3G and 3H are cross-sectional views taken along the line 3E to 3H–3E to 3H of FIG. 2. FIGS. 3A and 3E are cross-sectional views at the same point of time, FIGS. 3B and 3F are cross-sectional views at the same point of time, FIGS. 3C and 3G are cross-sectional views at the same point of time, and FIGS. 3D and 3H are cross-sectional views at the same point of time.

The operation of the step motor will now be described. From the state of FIGS. 3A and 3E, electric power is supplied to the coils 2 and 3 to thereby excite the outer magnetic poles 18a, 18b, 18c, 18d and 18e of the first stator 18 and into S poles, the first inner magnetic poles 21a, 21b 21c, 21d and 21e comprising the first auxiliary stator 21 into N poles, the outer magnetic poles 19a, 19b, 19c, 19d and 19e of the second stator 19a, 19b, 19c, 19d and 19e of the second stator 19 into N poles, and the second inner magnetic poles 22a, 22b, 22c, 22d and 22e comprising the second auxiliary stator 22 into S poles, whereupon the magnet 1, which is the rotor, is rotated by 18° in a counter-clockwise direction, and assumes the state shown in FIGS. 3B and 3F.

Next, the supply of electric power to the coil 3 is reversed to thereby excite the outer magnetic poles 18a, 18b, 18c, 18d and 18e of the first stator 18 into S poles, the inner magnetic poles 21a, 21b, 21c, 21d and 21e, comprising the first auxiliary stator 21, into N poles, the outer magnetic poles 19a, 19b, 19c 19d and 19e of the second stator 19 into S poles, and the second inner magnetic poles 22a, 22b, 22c, 22d and 22e, comprising the second auxiliary stator 22, into N poles, whereupon the magnet 1, which is the rotor, is further rotated by 18° in the counter-clockwise direction, and assumes the state shown in FIGS. 3C and 3G.

Next, the supply of electric power to the coil 2 is reversed to thereby excite the outer magnetic poles 18a, 18b, 18c, 18d and 18e of the first stator 18 into N poles, the first inner magnetic poles 21a, 21b, 21c, 21d and 21e, comprising the first auxiliary stator 21, into S poles, the outer magnetic poles 19a, 19b, 19c, 19d and 19e of the second stator 19 into S poles, and the second inner magnetic poles 22a, 22b, 22c, 22d and 22e, comprising the second auxiliary stator 22, into N poles, whereupon the magnet 1 which is the rotor is further rotated by 18° in the counter-clockwise direction, and assumes the state shown in FIGS. 3D and 3H.

Thereafter, the direction of supply of electric power to the coil 2 and the coil 3 is thus sequentially changed over, whereby the magnet 1, which is the rotor, is rotated to a position conforming to the electric power supply phase.

It will now be described that the step motor of such a construction is of a construction best suited for making the motor super-compact.

The basic construction of the step motor is as follows:

(1) the magnet is formed into a hollow, cylindrical shape;

(2) the outer peripheral surface of the magnet is circumferentially divided into n sections, which are alternately magnetized to different poles;

(3) inner magnetic poles, coils, the magnet, and outer magnetic poles are disposed diametrally of the magnet in the named order;

(4) the outer magnetic poles and inner magnetic poles of the first and second stators, excited by the first and second coils, are opposed to the outer peripheral surface and inner peripheral surface, respectively, of the magnet; and (5) the outer magnetic poles are formed by cut-away apertures and teeth extending in a direction parallel to the shaft.

The diameter of this step motor can have a size sufficient to oppose the magnetic poles of the stators to the diameters of the magnet and coils, and the length of the step motor can be the length of the magnet. Therefore, the size of the step motor is determined by the diameters and lengths of the magnet and coils, and if the diameters and lengths of the magnet and coils are made very small, the step motor can be made super-compact.

If at this time, the diameters and lengths of the magnet and coils are made very small, it will become difficult to maintain the accuracy as the step motor, but the problem of the accuracy of the step motor is solved by simple structure in which the magnet is formed into a hollow, cylindrical shape and the outer magnetic poles and inner magnetic poles of the first and second stators are opposed to the outer peripheral surface and inner peripheral surface of the magnet formed into the hollow cylindrical shape. At this time, only the outer peripheral surface of the magnet is circumferentially divided into n sections, which are alternately magnetized to S poles and N poles, but if the inner peripheral surface of the magnet is also circumferentially divided into n sections, which are alternately magnetized to S poles and N poles so as to differ from the adjacent outer peripheral surface, the output of the motor can be further enhanced.

Embodiment 2 of the present invention will now be described with reference to FIGS. 6 to 9. In this Embodiment 2, the phase difference between the first stator 18 and the second stator 19 is eliminated and these stators are positioned at the same location, and the magnetization phases of the first magnetized layer and second magnetized layer, formed on the magnet 1, are shifted from each other by 180/n degrees, i.e., 18°.

Figure 6:
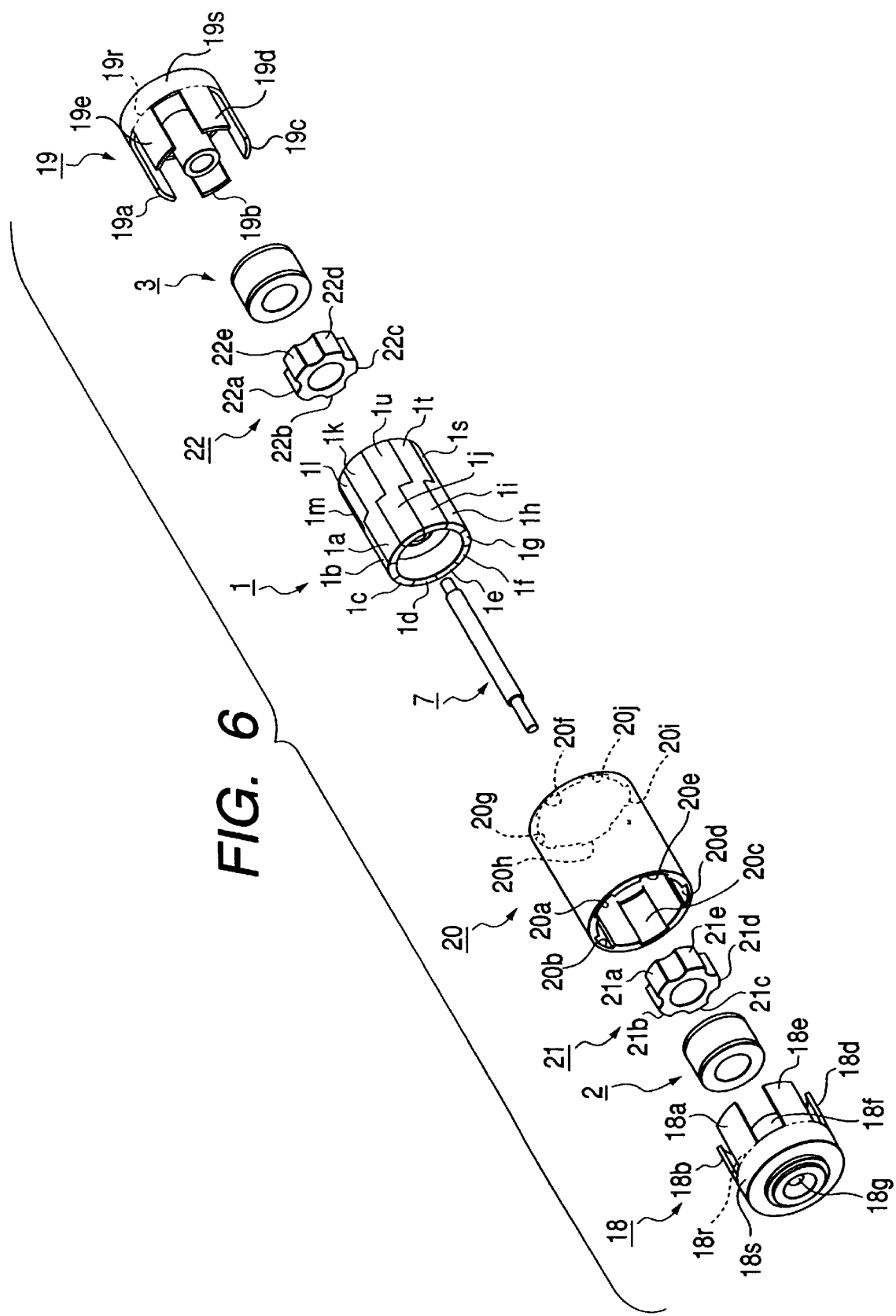
FIG. 6 is an exploded perspective view of a motor according to Embodiment 2 of the present invention.
Figure 7:
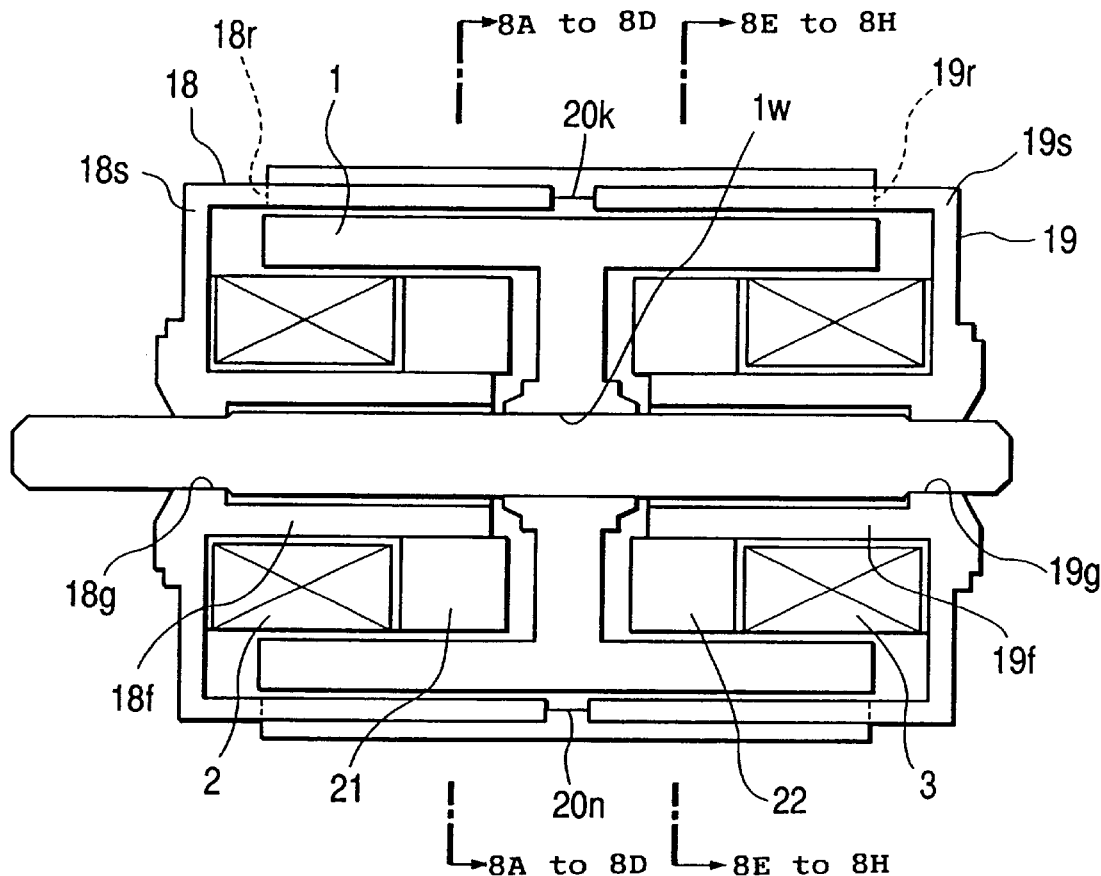
FIG. 7 is a cross-sectional view of the motor shown in FIG. 6 during the assembly thereof.
Figure 9:
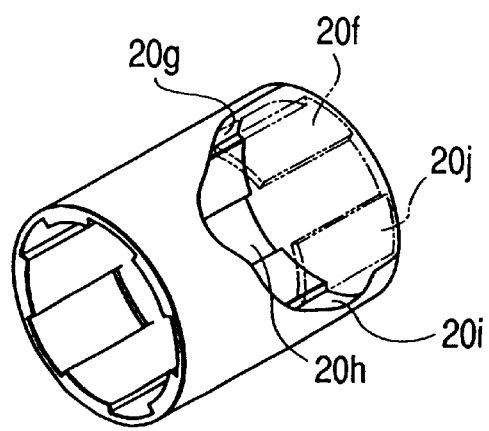
FIG. 9 is a partly cut-away perspective view of a connecting ring shown in FIG. 7.

FIGS. 6 to 9 show a step motor according to Embodiment 2 of the present invention. FIG. 6 is an exploded perspective view of the step motor, FIG. 7 is an axial cross-sectional view of the step motor after assembled, and FIGS. 8A to 8H are cross-sectional views taken along the line 8A to 8D–8A to 8D of FIG. 7 and cross-sectional view taken along the line 8E to 8H–8E to 8H of FIG. 7. FIG. 9 is a partly cut-away perspective view showing a connecting ring.

In FIGS. 6 to 9, the reference numeral 1 designates a cylindrically shaped magnet constituting a rotor, and this magnet 1, which is a rotor, is provided with two magnetized layers, i.e, a first magnetized layer and a second magnetized layer having their magnetization phases axially shifted by 18° from each other. The first magnetization layer comprises magnetized portions 1a, 1b, 1c, 1d, 1e, 1f, 1g, 1h, 1i and 1j provided by circumferentially dividing the outer peripheral surface of the magnet 1 into n sections (in the present embodiment, 10) alternately magnetized to S poles and N poles, and the magnetized portions 1a, 1c, 1e, 1g and 1i are magnetized to S poles, and the magnetized portions 1b, 1d, 1f, 1h and 1j are magnetized to N poles. Also, the second magnetized layer comprises magnetized portions 1k 1l, 1m, 1n, 1p, 1q, 1r, 1s, 1t and 1u provided by circumferentially dividing the outer peripheral surface of the magnet 1 into n sections (in the present embodiment, 10) alternately magnetized to S poles and N poles, and the magnetized portions 1k, 1m, 1p, 1r and 1t are magnetized to S poles, and the magnetized portions 1l, 1n, 1q, is and 1u are magnetized to N poles.

Also, the magnet is formed of a plastic magnet material formed by injection molding. Thereby, the thickness can be made very small with respect to the radial direction of the cylindrical shape. Also, the magnet 1 is provided with a fitting portion 1w of a small inner diameter in the axially central portion thereof.

The reference numeral 7 denotes an output shaft, which is a rotor shaft, and this output shaft 7 is secured to the fitting portion 1w of the magnet 1, which is the rotor by being pressed in. Since the magnet 1 is formed of a plastic magnet material formed by injection molding, it is not broken even by assembly by a press-in operation and the manufacture thereof becomes easy in spite of a complicated shape provided with the fitting portion 1w of a small inner diameter in the axially central portion. Also, since the output shaft 7 and the magnet 1 are assembled and secured by a press-in operation the assembly thereof is easy and inexpensive manufacture becomes possible. Also, the output shaft 7 and the magnet 1 together constitute the rotor.

The reference numerals 2 and 3 designate cylindrically shaped coils having an outer diameter slightly smaller than the inner diameter of the magnet 1. The coils 2 and 3 are concentric with the magnet 1 and are disposed inside the magnet 1.

The reference numerals 18 and 19 denote a first stator and a second stator, respectively, formed of a soft magnetic material, and the phases of the first a stator and the second stator are the same phase and these stators are disposed in face-to-face relationship with each other, and the first stator and the second stator each comprise an outer cylinder and an inner cylinder.

The outer cylinder of the first stator 18 has its fore end portion forming first outer magnetic poles 18*a*, 18*b*, 18*c*, 18*d* and 18*e*. The reference numeral 21 designates a first auxiliary stator having its inner diameter portion 21*f* fitted and secured to the inner cylinder 18*f* of the first stator 18 and having its outer diameter portion formed with radially outwardly protruding portions 21*a*, 21*b*, 21*c*, 21*d* and 21*e*, which are first inner magnetic poles at phases opposed to the outer magnetic poles 18*a*, 18*b*, 18*c*, 18*d* and 18*e* of the first stator 18. The protruding portions 21*a*, 21*b*, 21*c*, 21*d* and 21*e*, which are the first inner magnetic poles are formed with a deviation of 360/(n/2) degrees, i.e., 72°, so as to be in phase with respect to the magnetization of the magnet 1, and the first outer magnetic poles 18*a*, 18*b*, 18*c*, 18*d* and 18*e* of the first stator 18 are formed with a deviation of 360/(n/2) degrees, i.e., 72°, so as to be in phase with respect to the magnetization of the magnet 1. The first outer magnetic poles 18*a*, 18*b*, 18*c*, 18*d* and 18*e* and the first inner magnetic poles 21*a*, 21*b*, 21*c*, 21*d* and 21*e* are disposed in opposed relationship with the outer peripheral surface and the inner peripheral surface, respectively, relative to the first magnetized layer of the magnet 1, and the first outer magnetic poles and the first inner magnetic poles sandwich the first magnetized layer of the magnet 1 therebetween with a gap. The first auxiliary stator 21 is located between the coil 2 and the coil 3, i.e., between the coil 2 and a wall portion forming the fitting portion 1*w* of the magnet 1.

The outer cylinder of the second stator 19 has its fore end portion forming second outer magnetic poles 19*a*, 19*b*, 19*c*, 19*d* and 19*e*. The reference numeral 22 denotes a second auxiliary stator having its inner diameter portion 22*f* fitted and secured to the inner cylinder 19*f* of the second stator 19 and having its outer diameter portion formed with radially outwardly protruding portions 22*a*, 22*b*, 22*c*, 22*d* and 22*e* which are second magnetic poles at phases opposed to the outer magnetic poles 19*a*, 19*b*, 19*c*, 19*d* and 19*e* of the second stator. The protruding portions 22*a*, 22*b*, 22*c*, 22*d* and 22*e* which are the second inner magnetic poles are formed with a deviation of 360/(n/2) degrees, i.e., 72°, so as to be in phase with respect to the magnetization of the magnet 1, and the second outer magnetic poles 19*a*, 19*b*, 19*c*, 19*d* and 19*e* of the second stator 19 are formed with a deviation of 360/(n/2) degrees, i.e., 72°, so as to be in phase with respect to the magnetization of the magnet 1. The second outer magnetic poles 19*a*, 19*b*, 19*c*, 19*d* and 19*e* and the first inner magnetic poles 22*a*, 22*b*, 22*c*, 22*d* and 22*e* are disposed in opposed relationship with the outer peripheral surface and the inner peripheral surface, respectively, relative to the second magnetized layer of the magnet 1, and the second outer magnetic poles and the second inner magnetic poles sandwich the second magnetic layer of the magnet 1 therebetween with a gap. The second auxiliary stator 22 is located between the coil 2 and the coil 3, i.e., between the coil 3 and the wall portion forming the fitting portion 1*w* of the magnet 1.

The outer magnetic poles 18*a*, 18*b*, 18*c*, 18*d* and 18*e* of the first stator 18 and the outer magnetic poles 19*a*, 19*b*, 19*c*, 19*d* and 19*e* of the second stator 19 are constituted by cut-away apertures and teeth extending in a direction parallel to the shaft. By this construction, the formation of the magnetic poles becomes possible while minimizing the diameter of the motor. That is, if the outer magnetic poles are formed by radially extending unevenness, the diameter of the motor will become correspondingly larger, but in the present embodiment, the outer magnetic poles are constituted by cut-away apertures and teeth extending in a direction parallel to the shaft and therefore, the diameter of the motor can be minimized.

The outer magnetic poles 18*a*, 18*b*, 18*c*, 18*d* and 18*e* of the first stator 18 and the outer diameter portions 21*a*, 21*b*, 21*c*, 21*d* and 21*e* of the first auxiliary stator, which are the first inner magnetic poles, are provided so as to sandwich one end of the magnet 1, i.e., one end of the magnet in opposed relationship with the outer peripheral surface and inner peripheral surface of the first magnetized layer. Also, one end portion of the output shaft 7 is rotatably fitted in the aperture 18*g* of the first stator 18.

The outer magnetic poles 19*a*, 19*b*, 19*c*, 19*d* and 19*e* of the second stator 19 and the outer diameter portions 22*a*, 22*b*, 22*c*, 22*d* and 22*e* of the second auxiliary stator, which are the second inner magnetic poles, are provided so as to sandwich the other end of the magnet 1, i.e., the other end of the magnet in opposed relationship with the outer peripheral surface and inner peripheral surface of the second magnetized layer. Also, the other end portion of the output shaft 7 is rotatably fitted in the aperture 19*g* of the second stator 19.

The coil 2 is provided between the outer cylinder and inner cylinder of the first stator 18, and by this coil 2 being supplied with electric power, the first stator 18 and the first auxiliary stator 21 are excited.

The coil 3 is provided between the outer cylinder and inner cylinder of the second stator 19, and by this coil 3 being supplied with electric power, the second stator 19 and the second auxiliary stator 22 are excited.

Accordingly, a magnetic flux created by the coil 2 crosses the magnet 1, which is the rotor, between the outer magnetic poles 18*a*, 18*b*, 18*c*, 18*d*, 18*e* and the inner magnetic poles 21*a*, 21*b*, 21*c*, 21*d*, 21*e* and therefore effectively acts on the magnet which is the rotor, and a magnetic flux created by the coil 3 crosses between the outer magnetic poles 19*a*, 19*b*, 19*c*, 19*d*, 19*e* and the inner magnetic poles 22*a*, 22*b*, 22*c*, 22*d*, 22*e* and therefore effectively acts on the magnet which is the rotor, thereby enhancing the output of the motor.

The route and rate of the magnetic flux flowing into the outer magnetic poles are as described in connection with Embodiment 1 with reference to FIG. 5. That is, about 90% of the magnetic flux flowing into the outer magnetic poles flow from the outer magnetic poles to the inner magnetic poles, and it goes out of the whole of the inner surfaces of the outer magnetic poles. Accordingly, the output of the motor is enhanced by opposing the outer peripheral surface of the magnet 1 to the whole of the inner surfaces of the outer magnet poles.

So, by disposing the first coil 2 inside the magnet 1 with a clearance interposed therebetween, it is possible to secure a large area for the portion in which the first outer magnetic pole portions 18*a*, 18*b*, 18*c*, 18*d* and 18*e* and the outer peripheral surface of the magnet 1 are opposed to one another. Likewise, by disposing the second coil 3 inside the magnet 1, it is possible to secure a large area for the portion in which the second outer magnetic pole portions 19*a*, 19*b*, 19*c*, 19*d* and 19*e* and the outer peripheral surface of the magnet 1 are opposed to one another. Thereby, the rate of the magnetic fluxes going around the coils which cross the magnet is increased, and the output of the motor is enhanced.

While here, the first coil 2 and the second coil 3 are disposed inside the magnet 1, it is likewise possible to secure a large area in which the outer magnetic poles and the outer peripheral surface of the magnet are opposed to one another even if the coils are disposed so as to surround the outside of the magnet 1 and thus, the output of the motor is enhanced.

The first coil has a positional relation in which it is opposed to the magnet with a clearance interposed therebetween relative to the diametral direction, and the second coil has a positional relation in which it is opposed to the magnet with a clearance interposed therebetween relative to the diametral direction, whereby the magnetic flux going around the first coil can be made to directly cross the magnet and it becomes possible to secure a large area for the portion in which the first outer magnetic pole portions and the outer peripheral surface of the magnet are opposed to one another, and the magnetic flux going around the second coil can be made to directly cross the magnet and it becomes possible to secure a large area for the portion in which the second outer magnetic pole portions and the outer peripheral surface of the magnet are opposed to one another. Thereby, the rate of the magnetic fluxes created by the coils which cross the magnet is increased, and the output of the motor is enhanced.

The magnetic flux in an inner portion (the base side 18s or 19s of the stator) interior of the root portion 18r or 19r of the outer magnetic pole portions does not contribute to the rotation of the rotor.

Therefore, it is enough if the magnet has a length axially from the root portion 18r of the first outer magnetic pole portion 18 to the root portion 19r of the second outer magnetic pole portion 19. Also, by the magnet having a length axially from the root portion 18r of the first outer magnetic pole portion to the root portion 19r of the second outer magnetic pole portion, substantially all of the magnetic flux flowing from the first outer magnetic pole portion to the first inner magnetic pole portion crosses the magnet, and substantially all of the magnetic flux flowing from the second outer magnetic pole portion to the second inner magnetic pole portion crosses the magnet. As the result, the rate of the magnetic fluxes created by the coils, which are converted into a rotative force, is increased and therefore, the efficiency of the motor is enhanced.

The reference numeral 20 designates a connecting ring as a cylindrically shaped member formed of a non-magnetic material, and the details thereof are shown in the partly cut-away perspective view of FIG. 9. Grooves 20a, 20b, 20c, 20d and 20e are formed in the inner end side of this connecting ring 20, and grooves 20f, 20g, 20h, 20i and 20j which are of the same phase with respect to the grooves 20a, 20b, 20c, 20d and 20e are formed in the other end side of the connecting ring 20, and the outer magnetic poles 18a, 18b, 18c, 18d and 18e of the first stator 18 are fitted in the grooves 20a, 20b, 20c, 20d and 20e, respectively, and the outer magnetic poles 19a, 19b, 19c, 19d and 19e of the second stator are fitted in the grooves 20f, 20g, 20h, 20i and 20j, respectively, and these members are fixed to each other by an adhesive agent. The first stator 18 and the second stator 19 are fixed with a certain distance interposed therebetween by the protruding portions 20k and 20n on the inner side of the connecting ring 20.

That is, the first stator 18 and the second stator 19 are disposed, so that the fore ends of the outer magnetic poles 18a, 18b, 18c, 18d and 18e of the first stator 18 and the fore ends of the outer magnetic poles 19a, 19b, 19c, 19d and 19e of the second stator 19 may face each other. By the connecting ring being formed of a non-magnetic material, the first stator 18 and the second stator 19 can be cut in magnetic circuits and can be prevented from affecting each other, whereby the performance of the motor is stabilized.

Figure 8D:
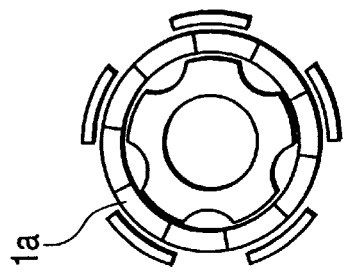
FIGS. 8A, 8B, 8C, 8D, 8E, 8F, 8G and 8H are illustrations of the rotational operation of the rotor of the motor shown in FIG. 7.
Figure 8C:
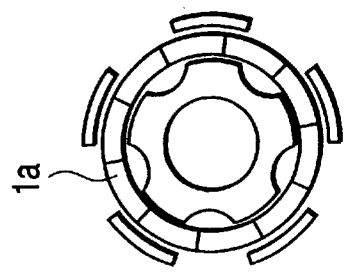
Figure 8B:
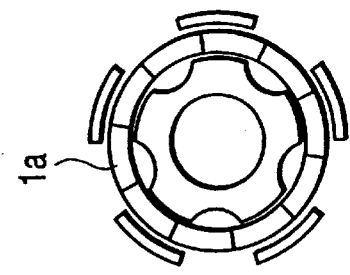
Figure 8A:
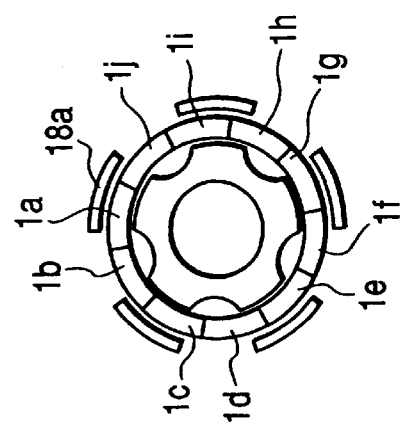
Figure 8H:
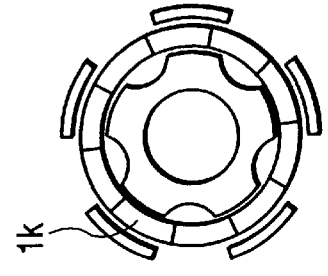
Figure 8G:
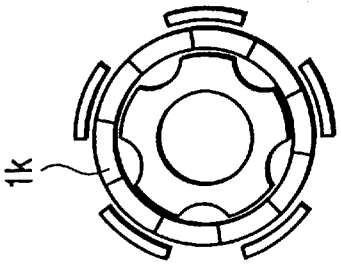
Figure 8F:
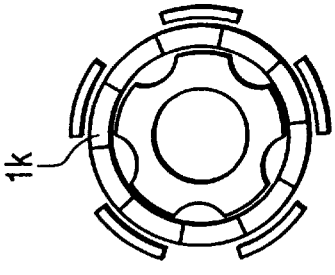
Figure 8E:
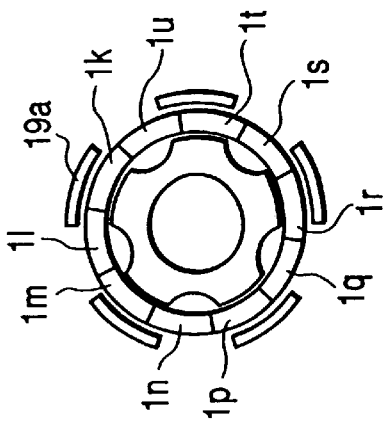

FIG. 7 is a cross-sectional view of the step motor, FIGS. 8A, 8B, 8C and 8D show cross-sectional views taken along the line 8A to 8D–8A to 8D of FIG. 7, and FIGS. 8E, 8F, 8G and 8H show cross-sectional views taken along the line 8E to 8H–8E to 8H of FIG. 7. FIGS. 8A and 8E are cross-sectional views at the same point of time, FIGS. 8B and 8F are cross-sectional views at the same point of time, FIGS. 8C and 8G are cross-sectional views at the same point of time, and FIGS. 8D and 8H are cross-sectional views at the same point of time.

The operation of the step motor will now be described. From the state of FIGS. 8A and 8E, electric power is supplied to the coils 2 and 3 to thereby excite the outer magnetic poles 18a, 18b, 18c, 18d and 18e of the first stator 18 into S poles, the first inner magnetic poles 21a, 21b, 21c, 21d and 21e, comprising the first auxiliary stator 21, into N poles, the outer magnetic poles 10a, 10b, 10c, 10d and 10e of the second stator 19 into N poles, and the second inner magnetic poles 22a, 22b, 22c, 22d and 22e, comprising the second auxiliary stator 22, into S poles, whereupon the magnet 1, which is the rotor, is rotated by 18° in a counter-clockwise direction, and assumes the state shown in FIGS. 8B and 8F.

Next, the supply of electric power to the coil 3 is reversed to thereby excite the outer magnetic poles 18a, 18b, 18c, 18d and 18e of the first stator 18 into S poles, the first inner magnetic poles 21a, 21b, 21c, 21d and 21e, comprising the first auxiliary stator 21, into N poles, the outer magnetic poles 19a, 19b, 19c, 19d and 19e of the second stator 19 into S poles, and the second inner magnetic poles 22a, 22b, 22c, 22d and 22e, comprising the second auxiliary stator 22, into N poles, whereupon the magnet 1, which is the rotor, is further rotated by 18° in the counter-clockwise direction, and assumes the state shown in FIGS. 8C and 8G.

Next, the supply of electric power to the coil 2 is reversed to thereby excite the outer magnetic poles 18a, 18b, 18c, 18d and 18e of the first stator 18 into N poles, the first inner magnetic poles 21a, 21b, 21c, 21d and 21e, comprising the first auxiliary stator 21, into S poles, the outer magnetic poles 19a, 19b, 19c, 19d and 19e of the second stator 19 into S poles, and the second inner magnetic poles 22a, 22b, 22c, 22d and 22e, comprising the second auxiliary stator 22, into N poles, whereupon the magnet 1, which is the rotor, is further rotated by 18° in the counter-clockwise direction, and assumes the state shown in FIGS. 8D and 8H.

Thereafter, the direction of supply of electric power to the coil 2 and the coil 3 is thus sequentially changed over, whereby the magnet 1 which is the rotor is rotated to a position conforming to the electric power supply phase.

It will now be described that the step motor of such a construction is of a construction best suited for making the motor super-compact.

The basic construction of the step motor is as follows:

(1) the magnet is formed into a hollow cylindrical shape;
(2) the outer peripheral surface of the magnet is circumferentially divided into n sections, which are alternately magnetized to different poles;
(3) inner magnetic poles, coils, the magnet and outer magnetic poles are disposed diametrally of the magnet in the named order;
(4) the outer magnetic poles and inner magnetic poles of the first and second stators excited by the first and second coils are opposed to the outer peripheral surface and inner peripheral surface, respectively, of the magnet; and
(5) the outer magnetic poles are formed by cut-away apertures and teeth extending in a direction parallel to the shaft.

The diameter of this step motor can have a size sufficient to oppose the magnetic poles of the stators to the diameters of the magnet and coils, and the length of the step motor can be the length of the magnet. Therefore, the size of the step motor is determined by the diameters and lengths of the magnet and coils, and if the diameters and lengths of the magnet and coils are made very small, the step motor can be made super-compact.

If at this time, the diameters and lengths of the magnet and coils are made very small, it will become difficult to maintain the accuracy as the step motor, but the problem of the accuracy of the step motor is solved by simple structure in which the magnet is formed into a hollow cylindrical shape and the outer magnetic poles and inner magnetic poles of the first and second stators are opposed to the outer peripheral surface and inner peripheral surface of the magnet formed into the hollow cylindrical shape. At this time, only the outer peripheral surface of the magnet is circumferentially divided into n sections, which are alternately magnetized to S poles and N poles, but if the inner peripheral surface of the magnet is also circumferentially divided into n sections, which are alternately magnetized to S poles and N poles so as to differ from the adjacent outer peripheral surface, the output of the motor can be further enhanced.

The first stator 18 and the second stator 19 are of the same phase and therefore, when for example, the coil terminals are to be drawn out from among the outer magnetic poles, the positions of the terminals become uniform and thus, it becomes easy to solder them to a circuit substrate (not shown).

Embodiment 3 of the present invention will now be described with reference to FIGS. 10 and 11.

Figure 11:
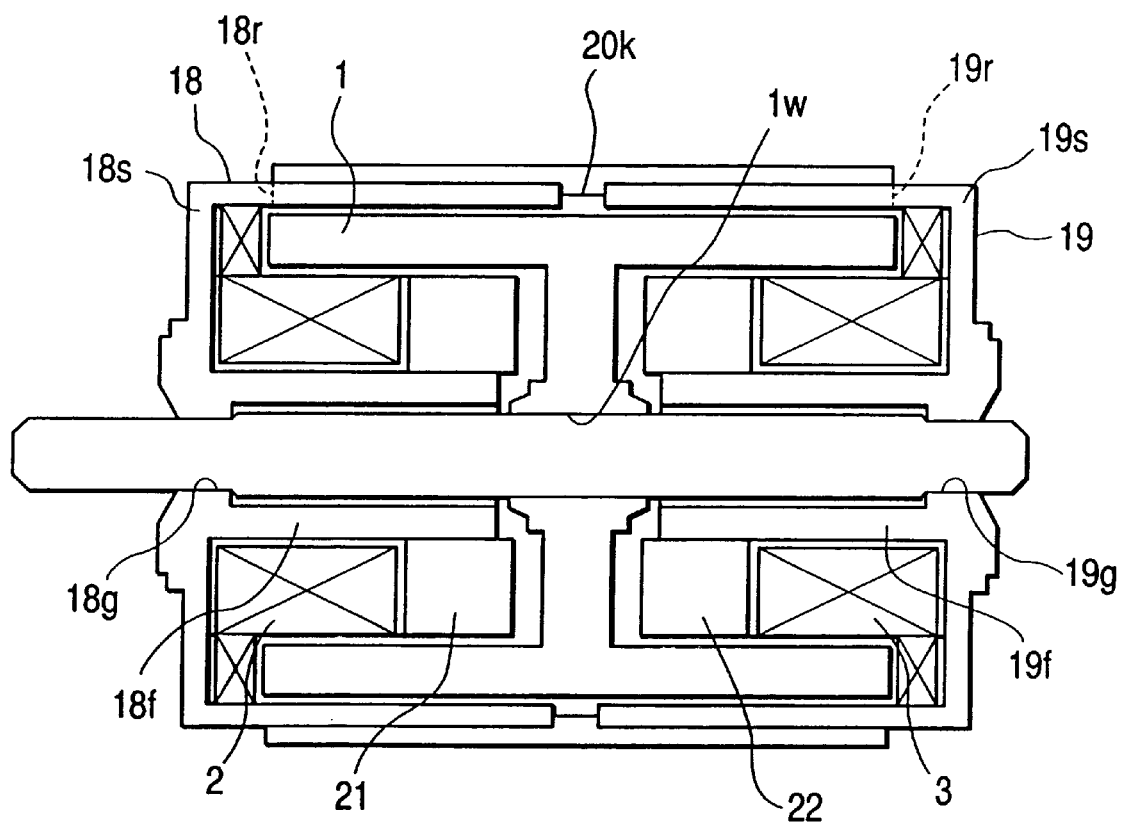
FIG. 11 is a cross-sectional view of the motor shown in FIG. 10 during the assembly thereof.
Figure 12:
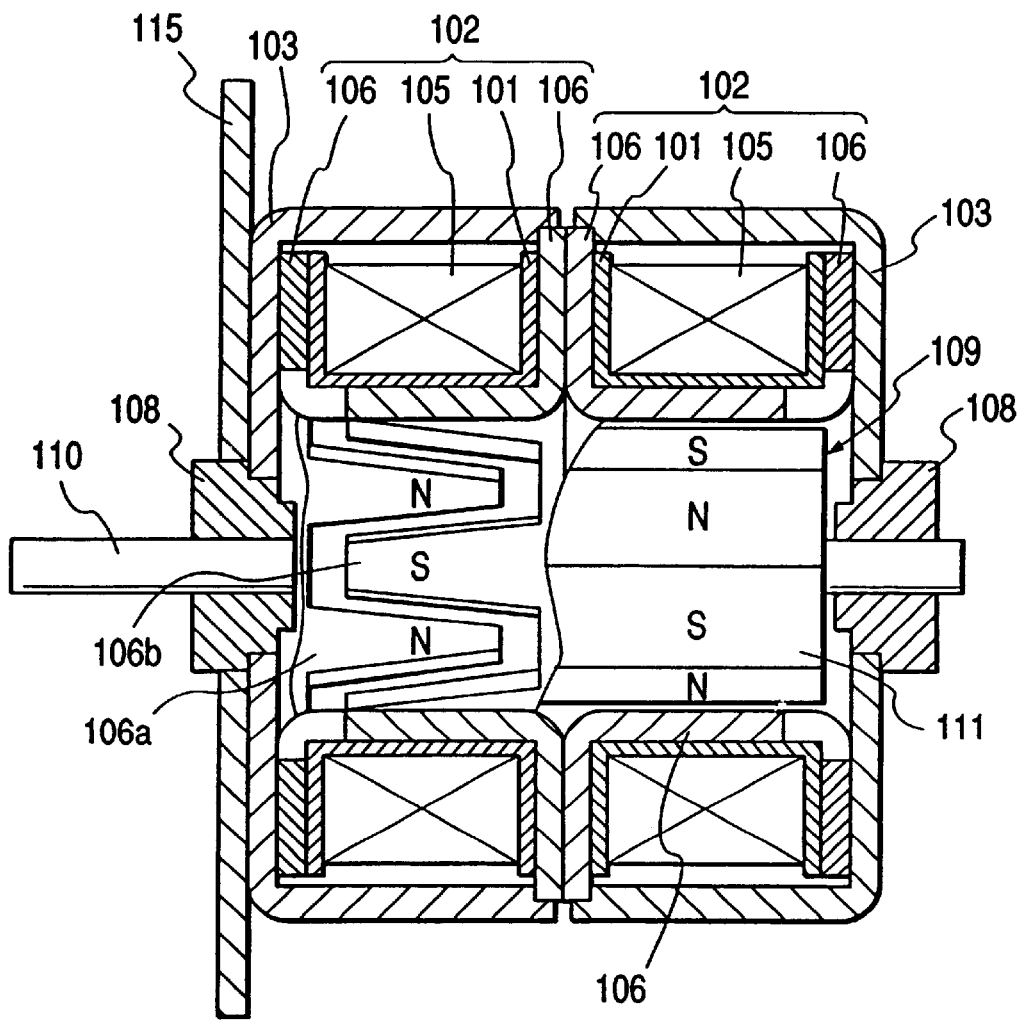
FIG. 12 is a cross-sectional view showing a step motor according to the prior art.
Figure 13:
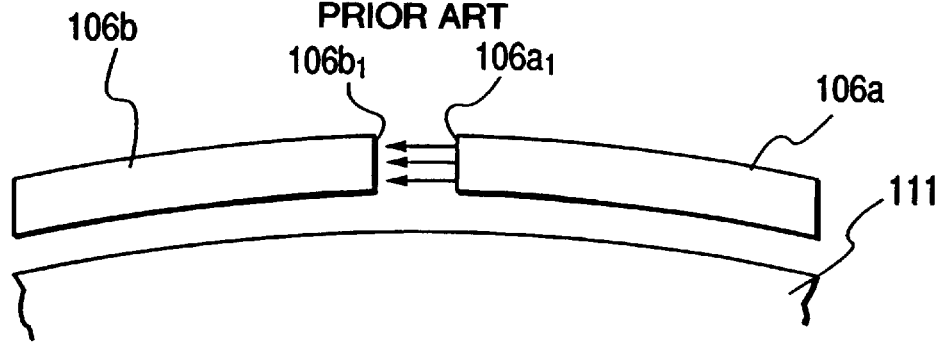
FIG. 13 is an illustration of the magnetic flux of the prior-art step motor shown in FIG. 12.

FIGS. 10 and 11 show a step motor according to Embodiment 3 of the present invention. FIG. 10 is an exploded perspective view of the step motor, and FIG. 11 is an axial cross-sectional view of the step motor after assembled. A magnet 1, an output shaft 7, a first stator 18, a second stator 19, a first auxiliary stator 21, a second auxiliary stator 22 and a connecting ring 20 are the same as those in Embodiment 1, and the principles of the operation thereof are also the same as those in Embodiment 1.

In the present embodiment, as shown in FIG. 11, the cross-sectional shape of the first coil 2 and the second coil 3 is an L-shape. More particularly, in the portion (base portion 18s) interior of the root portion 18r of the outer magnetic poles 18a, 18b, 18c, 18d and 18e of the first coil 2, the outer diameter of the coil is made large up to the same outer diameter as that of the magnet 1, and in the portion (base portion 19s) interior of the root portion 19r of the outer magnetic poles 19a, 19b, 19c, 19d and 19e of the second coil 3, the outer diameter of the coil is made large up to the same outer diameter as that of the magnet 1.

Thereby, the number of turns of the coils is increased and thus, the amount of magnetic flux created by the same electric current is increased and the output of the motor is enhanced. Also, the module loss by the coil current necessary to create a unit magnetic flux can be made low and thus, efficiency becomes high. In Embodiment 1, the portion 18s interior of the root portion 18r of the first outer magnetic poles 18a, 18b, 18c, 18d and 18e and the portion 19s interior of the root portion 19r of the second outer magnetic poles 19a, 19b, 19c, 19d and 19e are space portions because the magnetic fluxes in these portions do not contribute to torque, but in this Embodiment 3, the coils are disposed in these space portions and therefore, the dimension of the motor does not differ from that in Embodiment 1.

While a description has been provided of a case where the first coil 2 and the second coil 3 are disposed inside the magnet 1, the efficiency of the motor is likewise enhanced when the coils are disposed so as to surround the outside of the magnet 1.

That portion of the first coil which is not opposed to the magnet with a clearance interposed therebetween relative to the diametral direction has a positional relation in which the coil overlaps the magnet in the diametral direction, and that portion of the second coil which is not opposed to the magnet with a clearance interposed therebetween relative to the diametral direction has a positional relation in which the coil overlaps the magnet in the diametral direction, whereby a coil is also disposed in the space portion joining the first outer magnetic pole portions and the first inner magnetic pole portions together, and a coil is also disposed in the space portion joining the second outer magnetic pole portions and the second inner magnetic pole portions together. Thereby, the number of turns of the coils is increased and therefore, the output and efficiency of the motor are enhanced.

Also, while a description has been provided of a case where the magnet 1 shown in Embodiment 1 comprises only a single magnetized layer, the present invention can likewise be applied to a case where as shown in Embodiment 2, the magnet 1 comprises a first magnetized layer and a second magnetized layer.

While in each of the above-described embodiments, the first auxiliary stator 21 and the second auxiliary stator 22 are fitted to the inner cylinders 18f and 19f of the first and second stators 18 and 19 and are formed discretely from the inner cylinders 18f and 19f, the present invention is not restricted thereto, but the first auxiliary stator 21 and the second auxiliary stator 22 may be formed integrally with the inner cylinders 18f and 19f in such a manner as to protrude from the inner cylinders 18f and 19f, and in this case, the inner cylinders and outer cylinders of the first stator 18 and the second stator 19 are formed discretely from each other, and are welded together and fixed after the coil 2 and the coil 3 are incorporated.

As described above in detail, according to the present invention, there is constructed a motor which is provided with a magnet formed into a cylindrical shape and has at least its outer peripheral surface circumferentially divided into n sections, which are magnetized to different poles, and in which a first coil and a second coil are successively disposed axially of the magnet, and first outer magnetic poles and first inner magnetic poles excited by the first coil are opposed to the outer peripheral surface and inner peripheral surface of one end of the magnet and second outer magnetic poles and second inner magnetic poles excited by the second coil are opposed to the outer peripheral surface and inner peripheral surface of the other end of the magnet and therefore, a motor of a novel construction entirely differing from the prior-art one can be provided, and this is a construction best suited for making the motor super-compact.

Also, the magnet is formed into a hollow cylindrical shape, and the first and second outer magnetic poles and inner magnetic poles are opposed to the outer peripheral surface and inner peripheral surface of the magnet formed into the hollow cylindrical shape, whereby an effective output can be obtained as a motor.

Also, as previously described, the magnet is formed of a plastic magnet material formed by injection molding, whereby the thickness thereof can be made very small with respect to the radial direction of the cylindrical shape. Therefore, the distance between the outer magnetic poles and inner magnetic poles of the first stator can be made very small and the magnetic resistance of a magnetic circuit formed by the coils and the first stator can be made small. Also, the distance between the outer magnetic poles and inner magnetic poles of the second stator can be made very small and the magnetic resistance of a magnetic circuit formed by the coils and the second stator can be made small. Thus, a great deal of magnetic flux can be created by a small electric current, and the increased output and lower power consumption of the motor and the downsizing of the coils are achieved.

The output shaft is secured to the fitting portion of the magnet which is the rotor by being pressed in. Since the magnet is formed of a plastic magnet material formed by injection molding, it is not broken by the assembly by a press-in operation and even if it is of a complicated shape provided with a fitting portion of a small inner diameter in the axially central portion thereof, the manufacture thereof becomes easy. Also, the output shaft and the magnet are assembled and secured by a press-in operation, and therefore, the assembly thereof is easy and the inexpensive manufacture thereof becomes possible.

The first coil has a positional relation in which it is opposed to the magnet with a clearance interposed therebetween relative to the diametral direction thereof and the second coil has a positional relation in which it is opposed to the magnet with a clearance interposed therebetween relative to the diametral direction thereof, whereby a magnetic flux going around the first coil can be made to directly cross the magnet and it becomes possible secure a large area in which the first outer magnetic pole portions and the outer peripheral surface of the magnet are opposed to each other, and a magnetic flux going around the second coil can be made to directly cross the magnet and it becomes possible to secure a large area in which the second outer magnetic pole portions and the outer peripheral surface of the magnet are opposed to each other. Thereby the rate of the magnetic fluxes created by the coils which cross the magnet is increased and the output of the motor is enhanced.

Also, the magnet is made to have the length axially from the root portion of the first magnetic poles to the root portion of the second magnetic poles, whereby substantially all of the magnetic flux flowing from the first outer magnetic pole portions to the first inner magnetic pole portions crosses the magnet, and substantially all of the magnetic flux flowing from the second outer magnetic pole portions to the second inner magnetic pole portions crosses the magnet. Thereby, the rate of the magnetic fluxes created by the coils, which are converted into a rotative force, is increased and therefore, the efficiency of the motor is enhanced.

Further, that portion of the first coil which is not opposed to the magnet with a clearance interposed therebetween relative to the diametral direction thereof has a positional relation in which it overlaps the magnet in the diametral direction thereof, and that portion of the second coil which is not opposed to the magnet with a clearance interposed therebetween relative to the diametral direction thereof has a positional relation in which it overlaps the magnet in the diametral direction thereof, whereby the coil is also disposed in a space portion joining the first outer magnetic pole portions and the first inner magnetic pole portions together, and the coil is also disposed in a space portion joining the second outer magnetic pole portions and the second inner magnetic pole portions together. Thereby, the number of turns of the coils is increased and therefore, the output and efficiency of the motor are enhanced.

What is claimed is:

1. A motor including:
   a magnet formed into a cylindrical shape and having at least its outer peripheral surface circumferentially divided into n sections, which are alternately magnetized to different poles;
   a first coil and a second coil provided in said magnet, said first coil and said second coil being disposed axially of said magnet;
   first outer magnetic poles excited by said first coil, said first outer magnetic poles being opposed to the outer peripheral surface of one end of said magnet;
   first inner magnetic poles excited by said first coil, said first inner magnetic poles being located between said first coil and said second coil, said first inner magnetic poles being opposed to an inner peripheral surface at one end side of said magnet;
   second outer magnetic poles excited by said second coil, said second outer magnetic poles being opposed to the outer peripheral surface of the other end of said magnet; and
   second inner magnetic poles excited by said second coil, said second inner magnetic poles being located between said first coil and said second coil, said second inner magnetic poles being opposed to an inner peripheral surface at another end side of said magnet.

2. A motor according to claim 1, wherein said magnet has a length from a root portion of said first outer magnetic poles to a root portion of said second outer magnetic poles.

3. A motor according to claim 1, wherein tip ends of said second outer magnetic poles are opposed to tip ends of said first outer magnetic poles.

4. A motor according to claim 1, wherein said first coil and said second coil have a positional relation in which they are opposed to said magnet with a clearance interposed therebetween relative to the diametral direction thereof.

5. A motor according to claim 4, wherein tip end portions of said first inner magnetic poles and said second inner magnetic poles protrude and are opposed to the inner peripheral surface of said magnet.

6. A motor according to claim 5, wherein said first coil and said second coil are large in the turn diameter thereof in their portions which are not opposed to said magnet with a clearance interposed therebetween relative to the diametral direction thereof.

7. A motor according to claim 1, wherein said first outer magnetic poles and said first inner magnetic poles together constitute a first stator, said second outer magnetic poles and said second inner magnetic poles together constitute a second stator, and said first outer magnetic poles and said second outer magnetic poles are connected together by a cylindrically shaped connecting member.

8. A motor according to claim 1, wherein said magnet has its inner peripheral surface circumferentially divided into n, which are alternately magnetized to different poles and magnetized to poles differing from the adjacent outer peripheral surface.

9. A motor including:
   a magnet formed into a cylindrical shape and having a first magnetized layer formed by at least its outer peripheral surface being circumferentially divided into n sections, which are alternately magnetized to different poles, and a second magnetized layer formed by at lest its outer peripheral surface circumferentially divided into n sections, which are alternately magnetized to different poles with a phase deviation of 180/n degrees;

a first coil and a second coil provided in said magnet, said first coil and said second coil being disposed axially of said magnet;

first outer magnetic poles excited by said first coil, said first outer magnetic poles being opposed to the outer peripheral surface of one end of said magnet;

first inner magnetic poles excited by said first coil, said first inner magnetic poles being located between said first coil and said second coil, said first inner magnetic poles being opposed to an inner peripheral surface at one end side of said magnet;

second outer magnetic poles excited by said second coil, said second outer magnetic poles being opposed to the outer peripheral surface of the other end of said magnet; and second inner magnetic poles excited by said second coil, said second inner magnetic poles being located between said first coil and said second coil, said second inner magnetic poles being opposed to an inner peripheral surface at another end side of said magnet.

10. A motor according to claim 9, wherein said magnetic has a length from a root portion of said first outer magnetic poles to a root portion of said second outer magnetic poles.

11. A motor according to claim 9, wherein tip ends of said second outer magnetic poles are opposed to tip ends of said first outer magnetic poles.

12. A motor according to claim 9, wherein said first coil and said second coil have a positional relation in which they are opposed to said magnet with a clearance interposed therebetween relative to the diametral direction thereof.

13. A motor according to claim 9, wherein tip end portions of said first inner magnetic poles and said second inner magnetic poles protrude and are opposed to the inner peripheral surface of said magnet.

14. A motor according to claim 13, wherein said first coil and said second coil are large in the turn diameter thereof in their portions which are not opposed to said magnet with a clearance interposed therebetween relative to the diametral direction thereof.

15. A motor according to claim 9, wherein said first outer magnetic poles and said first inner magnetic poles together form a first stator, said second outer magnetic poles and said second inner magnetic poles together form a second stator, and said first outer magnetic poles and said second outer magnetic poles are connected together by a cylindrically shaped connecting member.

16. A motor of a type in which a magnetic flux diametrally crossing a magnet which is a hollow cylindrically shaped rotor is created to thereby rotate the magnet which is the rotor having:

a rotary shaft;

a magnet formed into a cylindrical shape and magnetized in a predetermined pattern and mounted on said rotary shaft in the inner central portion thereof;

first and second coils disposed on the axially opposite sides of said magnet:

a first stator having an outer cylinder holding said first coil and provided with first outer magnetic poles so as to surround one end of the outer peripheral surface of said magnet, and having an inner cylinder inside said outer cylinder;

a second stator having an outer cylinder holding said second coil and provided with second outer magnetic poles so as to surround the other end of the outer peripheral surface of said magnet, and having an inner cylinder inside said outer cylinder;

first inner magnetic poles provided on said inner cylinder of said first stator and disposed radially between one end of the inner peripheral surface of said magnet and the inner cylinder and axially between the mounted portion of said magnet and said first coil, said first inner magnetic poles being opposed to the inner peripheral surface at one end side of said magnet; and second inner magnetic poles provided on said inner cylinder of said second stator and disposed radially between the other end of the inner peripheral surface of said magnet and the inner cylinder and axially between the mounted portion of said magnet and said second coil, said second inner magnetic poles being opposed to an inner peripheral surface at another end side of said magnet.

17. A motor according to claim 16, wherein said magnet has a length axially from a root portion of said first outer magnetic poles to a root portion of said second outer magnetic poles.

18. A motor according to claim 17, wherein each of said first and second coils is a coil of L-shaped cross-section, said first coil has a portion axially occupying a clearance between the end surface of said magnet and said first stator, and said second coil has a portion axially occupying a clearance between the end surface of said magnet and said second stator.

* * * * *

UNITED STATES PATENT AND TRADEMARK OFFICE
CERTIFICATE OF CORRECTION

PATENT NO. : 6,157,107
DATED : December 5, 2000
INVENTOR(S) : Chikara Aoshima, et al.

It is certified that error appears in the above-identified patent and that said Letters Patent is hereby corrected as shown below:

Column 1,
Line 51, "shaft" should read -- shaft, --.

Column 3,
Line 24, "operation" should read -- operation, --.
Line 48, "21e;" should read -- 21e, --.

Column 8,
Line 42, "is" should read -- 1s --.
Lines 44 and 53, "magnet" should read -- magnetic --.
Line 60, "operation" should read -- operation, --.

Column 9,
Line 3, "a" should be deleted.

Column 15,
Line 15, "operation" should read -- operation, --.
Line 30, "secure" should read -- to secure --.

Column 16,
Line 55, "n," should read -- n sections, --.
Line 64, "lest" should read -- least --.

Column 17,
Line 20, "magnetic" should read -- magnet --.

Signed and Sealed this

Fourth Day of December, 2001

Attest:

*Nicholas P. Godici*

NICHOLAS P. GODICI
*Attesting Officer*    *Acting Director of the United States Patent and Trademark Office*